United States Patent
Midavaine et al.

(10) Patent No.: US 9,953,226 B2
(45) Date of Patent: Apr. 24, 2018

(54) METHOD FOR DETECTING AND CLASSIFYING EVENTS OF A SCENE THAT INCLUDE FIRING THREAT TYPE EVENTS

(71) Applicant: THALES, Courbevoie (FR)

(72) Inventors: Thierry Midavaine, Paris (FR); Olivier Garin, Ollainville (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/110,937

(22) PCT Filed: Feb. 5, 2015

(86) PCT No.: PCT/EP2015/052430
§ 371 (c)(1),
(2) Date: Jul. 11, 2016

(87) PCT Pub. No.: WO2015/118075
PCT Pub. Date: Aug. 13, 2015

(65) Prior Publication Data
US 2016/0335504 A1    Nov. 17, 2016

(30) Foreign Application Priority Data
Feb. 7, 2014   (FR) .................................. 14 00350

(51) Int. Cl.
*G06K 9/00* (2006.01)
*G01J 1/02* (2006.01)
*G01J 5/00* (2006.01)
*G01J 5/02* (2006.01)
(Continued)

(52) U.S. Cl.
CPC ......... *G06K 9/00771* (2013.01); *F41G 3/147* (2013.01); *G01J 1/0219* (2013.01);
(Continued)

(58) Field of Classification Search
None
See application file for complete search history.

(56) References Cited

U.S. PATENT DOCUMENTS

| | | | |
|---|---|---|---|
| 6,178,141 B1 * | 1/2001 | Duckworth | F41H 11/00 367/124 |
| 7,778,006 B2 * | 8/2010 | Stewart | F42D 1/05 361/248 |

(Continued)

OTHER PUBLICATIONS

M. Engel et al., "Methodology for accurate multi-spectral signature measurement," Proceedings of SPIE, vol. 7113, Oct. 1, 2008, pp. 711312, XP055154940.
(Continued)

*Primary Examiner* — Tahmina Ansari
(74) *Attorney, Agent, or Firm* — Baker & Hostetler LLP

(57) ABSTRACT

The subject of the invention is a method for detecting and classifying events of a scene by means of a single-pupil imaging system equipped with a VisNIR detector in the 0.6 μm-1.1 μm band and with an SWIR detector, which comprises steps of acquiring synchronized VisNIR and SWIR successive 2D images, of displaying the VisNIR images, and of processing these images, which consists in: comparing the SWIR images so as to determine, for each pixel, the variation in illumination from one SWIR image to another and the peak value of these SWIR illuminations, if this variation in SWIR illumination is greater than a threshold, then an event associated with said pixel is detected and: its date, its temporal shape and its duration are determined, in the VisNIR images, the coordinates are determined of the corresponding pixel for which: the variation in the illumination from one VisNIR image to another and the peak value of these VisNIR illuminations are calculated, and these variations in SWIR and VisNIR illumination and their peak values are compared so as to estimate a temperature of the event, the distance of the corresponding point of the scene is estimated so as to calculate the intensity of the event on the basis of the SWIR and VisNIR illuminations and on the basis of this distance, the total energy of the event is (Continued)

estimated on the basis of its temporal shape and of its intensity, the event is classified as a function of its duration, its temperature, its intensity and its energy, the previous steps are repeated for another pixel of the SWIR images.

8 Claims, 5 Drawing Sheets

(51) Int. Cl.
*G01J 5/60* (2006.01)
*F41G 3/14* (2006.01)
*G01J 1/04* (2006.01)
*G01J 1/42* (2006.01)
*G06T 7/73* (2017.01)

(52) U.S. Cl.
CPC ........... *G01J 1/0242* (2013.01); *G01J 1/0488* (2013.01); *G01J 1/4228* (2013.01); *G01J 5/0066* (2013.01); *G01J 5/025* (2013.01); *G01J 5/0275* (2013.01); *G01J 5/602* (2013.01); *G06K 9/00624* (2013.01); *G06T 7/74* (2017.01); *G01J 2005/0077* (2013.01); *G06T 2207/10048* (2013.01); *G06T 2207/30212* (2013.01); *G06T 2207/30232* (2013.01)

(56) References Cited

U.S. PATENT DOCUMENTS

| | | | |
|---|---|---|---|
| 9,044,141 B2* | 6/2015 | Behrend | A61B 3/0008 |
| 9,310,289 B2* | 4/2016 | Behrend | A61B 3/1233 |
| 2014/0362302 A1* | 12/2014 | Behrend | A61B 3/1233 349/2 |
| 2015/0242702 A1* | 8/2015 | Aphek | G06K 9/00771 382/113 |
| 2016/0335504 A1* | 11/2016 | Midavaine | G06K 9/00624 |

OTHER PUBLICATIONS

A. Devir et al., "Fast multichannel radiometer for diagnosing munition flashes," Proceedings of SPIE, vol. 6940, Apr. 3, 2008, pp. 694010-694010-8, XP055154803.

S. Nadav, "Uncooled infrared sensor technology for hostile fire indication systems," Optical Engineering, vol. 50, No. 6, Jun. 1, 2011, pp. 061012, XP055152996.

M. Kastek et al., "Analysis of multispectral signatures of the shot," Sensors, and Command, Control, Communications, and Intelligence (C3I) Technologies for Homeland Security and Homeland Defense X, SPIE, vol. 8019, No. 1, May 13, 2011, pp. 1-11, XP060014431.

* cited by examiner

| Attributes | δt min | δt max | Tmin | Tmax | Imin | Imax | dim min | dim max | Emin | Emax |
| --- | --- | --- | --- | --- | --- | --- | --- | --- | --- | --- |
| units | s | s | K | K | relative | relative | m | m | J | J |
| Threats | | | | | | | | | | |
| Small arms munitions | | 0.001 | 1000 | 3000 | 1 | 1000 | 0.01 | 0.1 | 1 | 10 |
| Guns | 0.01 | 0.10 | 500 | 1500 | 100000 | 10000000 | 1 | 5 | 10000 | 10000000 |
| Sights | | duration of illumination | | | Not relevant | | | | | |
| RPG | 0.001 | 0.01 | 1000 | 2000 | 10000 | 100000 | 0.1 | 1 | 10 | 100 |
| Rocket | 0.50 | 5.00 | 1000 | 4000 | 1 | 100 | 0.1 | 5 | 100 | 100000 |
| Missile | 0.50 | 5.00 | 1000 | 3000 | 100 | 1000 | 1 | 10 | 1000 | 1000000 |
| 1.06μm laser | 0 | one frame | | | Not relevant | Not relevant | Not relevant | | 0.001 | 1 |
| Solar reflection | 0 | | 4500 | 7000 | | | | | | |

Fig 5

METHOD FOR DETECTING AND CLASSIFYING EVENTS OF A SCENE THAT INCLUDE FIRING THREAT TYPE EVENTS

CROSS-REFERENCE TO RELATED APPLICATIONS

This application is a National Stage of International patent application PCT/EP2015/052430, filed on Feb. 5, 2015, which claims priority to foreign French patent application No. FR 1400350, filed on Feb. 7, 2014, the disclosures of which are incorporated by reference in their entirety.

FIELD OF THE INVENTION

The field of the invention is that of the classification of events in an observed scene. This classification of events falls within the framework of the detection of threats before firing or after firing for self-protection or the collateral protection of vehicles, boats, aircraft such as helicopters or airplanes, or else military or civil infrastructures.

These platforms are liable to be exposed to various types of threats which may originate from all directions in 360° of azimuth around the platform or in regions with a solid angle of $2\pi$ steradians or more (supra-hemispherical) for ground platforms or else $4\pi$ steradians for aerial platforms. These threats are: firing of munitions, laser illuminations, weaponry sighting systems, the men who employ them (marksmen) or the possible platforms into which they are integrated.

Several systems of "Soft Kill" (neutralization of the threat before firing) or "Hard Kill" (neutralization of the threat after firing) type which integrate functions of threat detection, of reaction means, of protection, or of survival of the vehicle or of its crew and of retaliations, demand real-time detection functions with very short reaction times.

BACKGROUND

There are currently very few items of equipment available that meet the diversity of such threats. There are however:
- detectors of the start of gunfire (or "HFI", standing for "Hostile Fire Indicator"), which are based on acoustic solutions, or radar, or band 2 infrared or MWIR (Mid Wave InfraRed 3 µm-5 µm) or UV (Ultra Violet) or else a combination of these techniques;
- sniper detectors based on acoustic solutions for detecting the muzzle wave and the supersonic wave of the munition or for detecting, by cat's eye effect (Pointed-Optics Detectors—PODs), their sighting means;
- Missile Departure Detectors (MDDs or Missile Warning Sensors—MWSs) based on radar, UV or MWIR detections;
- Laser Warning Detectors (or LWDs) based on optical detections on the wavelengths of lasers employed for military applications.

These types of receivers are sometimes found on high-value airplanes such as fighter aircraft. On armored vehicles, they are rarer on account of the unit costs of such equipment and the cost of integrating them into a protection system, as compared with the value of the platform.

LWDs or MDDs have been on the market for more than 20 years and have not found any actual outlets on terrestrial vehicles.

A few companies offer equipment at various levels of technological advancement for detecting missile launches or gunfire, based on techniques associating N cameras—for example 4, each covering a 90° bearing sector so as to ensure 360° coverage. These networks of N distributed and synchronized cameras still constitute solutions that are expensive and complex to integrate, and are in fact cost-prohibitive. In fact, today most armored vehicles have no protection means other than their armor. Indeed, the existing solutions in the terrestrial domain are not satisfactory, essentially due to the costs and difficulty of assembling a complete protection system. Indeed, it is useless to detect threats if one does not know how to react in such a way as to ensure that the threat or its effects are neutralized, thus ensuring the survival of the crew or the platform, or else that the mission can continue to be carried out.

SUMMARY OF THE INVENTION

The aim of the invention is to alleviate these drawbacks.

More precisely, the subject of the invention is a method for detecting and classifying events of firing threats type of a scene by means of a single-pupil imaging system mounted on a mobile platform and equipped with several detectors, including a detector in the 0.6 µm-1.1 µm wavelength band termed the VisNIR (Visible Near InfraRed) detector and a detector in the 0.9 µm-1.7 µm wavelength band, or band 1, termed the SWIR (Short Wave InfraRed) detector, associated with a processing unit, which comprises a step of acquiring successive 2D images of the scene which arise from the VisNIR detector, termed VisNIR images, and successive 2D images of the scene which arise from the SWIR detector and are synchronized with the VisNIR images, termed SWIR images, a step of displaying the VisNIR images, and a step of processing the VisNIR and SWIR images via the processing unit. It is mainly characterized in that this step of processing the images comprises the following sub-steps:

comparing the successive SWIR images so as to determine, for each pixel $(x_1, y_1)$ and neighboring pixels, the variation in illumination from one SWIR image to another and the peak value $e_1(t)$ of these so-called SWIR illuminations, if this variation in SWIR illumination is greater than a predetermined illumination threshold, then this variation in SWIR illumination during which it is greater than said threshold is designated as the signature of an event i and an event is associated with said pixel $(x_1, y_1)$ or with the barycenter of the pixels considered, and:

the date $t_i$ of the event i is determined, the temporal shape and the duration $\delta t_i$ of the signature of the event i are determined, the coordinates of the pixel $(x_2, y_2)$ and of the neighboring pixels corresponding to the pixel $(x_1, y_1)$ or to the barycenter are determined in the VisNIR images synchronized with the SWIR images, and for this pixel $(x_2, y_2)$ and these neighboring pixels:

the variation in the illumination from one VisNIR image to another and the peak value $e_2(t)$ of these so-called VisNIR illuminations are calculated, and these variations in SWIR and VisNIR illumination and their peak values $e_1(t)$ and $e_2(t)$ are compared so as to estimate a temperature of the event on the basis of a predetermined lookup table, if the scene is a daytime scene and the temperature is greater than a temperature threshold, then the event is a false alarm (=the event is rejected) and the previous steps are repeated with another pixel, otherwise:
on the basis of measurements of angular velocities of elements of the scene and of the velocity of the platform, and of the VisNIR images, the distance $R_i$ of the corresponding point of the scene is estimated so as to calculate the intensity $I_i$ of the event i on the basis of the SWIR and VisNIR illuminations of this pixel and on the basis of this distance $R_i$, the total energy $E_i$ of the event is estimated on the basis of the temporal shape of the signature of the event and of the intensity $I_i$, the event i is classified as a function of its duration $\delta t_i$, its temperature $T_i$, its intensity $I_i$ and its energy $E_i$, the previous steps are repeated for another pixel of the SWIR images.

By virtue of this method, the VisNIR detector makes it possible to ensure the basic function of high-resolution day and night vision together with complementary functions for detecting, angularly locating and classifying events (or threats) or for rejecting false alarms, through the joint use of one (or several) detector(s) of SWIR type, possibly multispectral, and by determining attributes of duration, of temperature and of intensity of these events.

When an event is associated with several adjacent pixels of more than 4×4 pixels for example, then the luminance of the event in the SWIR band is determined, and the event is also classified as a function of its luminance in the SWIR region.

In the visible-near IR band, it is also possible to measure the apparent luminance associated with the event. These two luminances, SWIR and VisNIR, make it possible to estimate the temperature of the event (already estimated as indicated previously) with more precision. Moreover, having estimated the distance of the event, it is possible to estimate its magnitude, its intensity and its total energy.

Preferably, the event is inlayed on the VisNIR image displayed, optionally accompanied by the associated distance. It can be inlaid in augmented reality by inlaying a symbol, for example a colored reticle with associated data. This distance information enables the classification of the detected threat to be made more robust, and makes it possible to evaluate its degree of threat or of priority and to evaluate whether we are within lethality range of this threat and optionally to undertake a suitable retaliation automatically or in a manner supervised by an operator (movement, masking by firing smoke grenades, retaliation in order to neutralize the threatening firing post, retaliation in order to neutralize the munition for example).

According to a characteristic of the invention, the processing unit is linked to an event management system and the detection and classification method furthermore comprises a step of triggering this management system on the basis of the classified event and of its distance.

The subject of the invention is also a computer program product, said computer program comprising code instructions making it possible to perform the steps of the method as described above, when said program is executed on a computer.

The subject of the invention is also a system for detecting and classifying events of a scene, which comprises:
a system for single-pupil imaging of the scene, mounted on a mobile platform and equipped with several detectors, including a visible-near IR detector and an SWIR detector,
a processing unit linked to the detectors,
means for estimating the distances between points of the scene and the imaging system,
a display device linked to the processing unit, characterized in that the processing unit comprises means for implementing the detection and classification method as described above.

BRIEF DESCRIPTION OF THE DRAWINGS

Other characteristics and advantages of the invention will become apparent on reading the detailed description which follows, given by way of nonlimiting example and with reference to the appended drawings in which:

FIG. 5 shows an example of threat classification determined as a function of its attributes.

Across the figures, the same elements are labeled with the same references.

DETAILED DESCRIPTION

Figure 1:
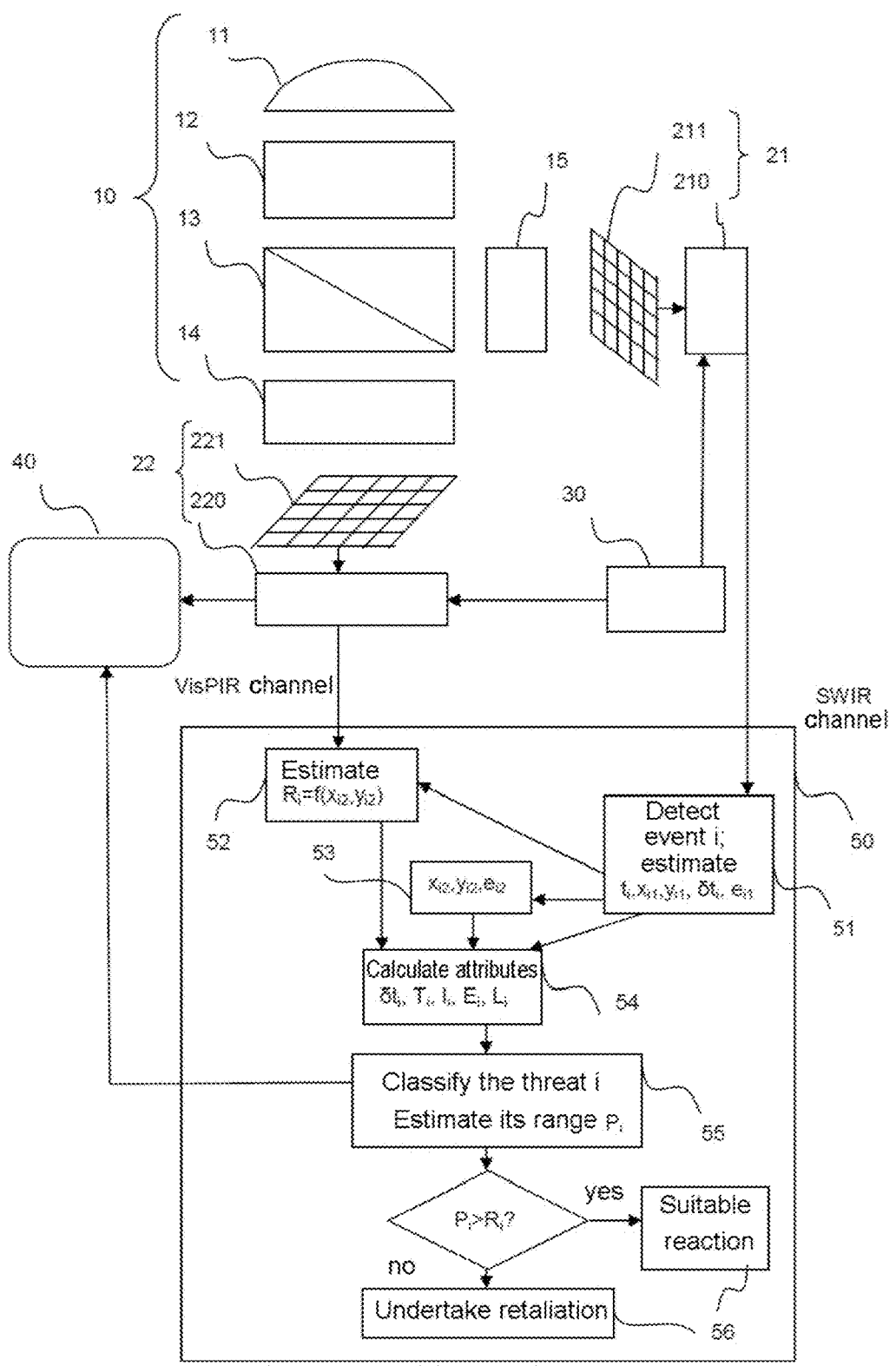
FIG. 1 schematically represents an exemplary system used to implement the method according to the invention.

The detection and classification method according to the invention is implemented by means of a single-pupil imaging system depicted in FIG. 1, comprising an optic 10 designed to accommodate at least two focal planes with in one case a visible—NIR (0.6 μm-1.1 μm or else 0.4 μm-1.1 μm encompassing the visible region) detector 22 and in the other a Band 1 or SWIR (0.9 μm-1.7 μm) detector 21. This optic is preferably designed to form on each detector a panoramic image of the scene to be observed; it comprises a head module 11 with hemispherical or even greater field, followed by optical elements 12 for forming the images, a dichroic splitter 13 and, on each spectral channel, an adaptation optic 14 and 15. A catadioptric combination (mirrors and diopters made of glass) is for example used so as to allow it to operate in a very broad spectral band: Visible, Near IR (NIR) and Band 1 (SWIR). Using an optic that is common to the two detectors makes it possible to avoid the parallax effect on the images arising from these detectors.

The SWIR matrix detector 21, which is for example based on InGaAs, typically has a matrix format of 320 rows×256 columns at a spacing of 30 μm with an image rate of 400 Hz, or 640 rows×512 columns at a spacing of 15 μm with an image rate of 300 Hz, which correspond to the current state of the art. This detector typically has a spatial resolution of 4 mrd for a pixel with the 640×512 format. Larger formats can be envisaged. However, the image rate and temporal response requirements for the classification of threats which are for the most part very brief (duration generally <100 ms) demand acquisition rates equal to or greater than 200 Hz or even 1000 Hz if it is desired to classify small calibers. The detector integrates its readout and multiplexing circuit, termed ROIC (standing for "Read Out Integrated Circuit").

The pixels are furnished with one or more suitable filters such as:
A single filter over the whole matrix of pixels 211 which simultaneously allows through a narrow band around 1.064

μm and a wide band above 1.4 μm up to the detector's cutoff wavelength, for example 1.7 μm or beyond.

Several different filters each suitable for a pixel, for example on a 2×2 tiling, with:

A sub-band for the detection of start-of-blast signatures (1.4-1.7 μm)

Narrow bands tuned to the laser spectral lines (1.06 μm, 1.5 μm, . . . )

The readout circuit or ROIC is linked to proximity electronics (or E-prox) 210 of the detector; the ROIC and/or the E-prox integrate particular functions such as for example:

A high-rate readout above 200 Hz or less than 5 ms of period and of integration time with no dead time; the integration time is equal or very close to the image frame acquisition period.

A high dynamic range (HDR mode) that can be achieved in various ways: dual-slope, root or logarithmic nonlinear response for example, reset before saturation countdown . . . .

A CMOS Silicon detector is for example used as visible detector 22. It has a high spatial resolution (for example 1 mrd for 1 pixel) and operates at a rate of 25 Hz or more generally between 25 Hz and 100 Hz. A 4T or 5T CMOS matrix 221 (with 4 or 5 transistors in the pixel) with low noise and amplification and column-wise parallel analog-digital conversion, such as an s-CMOS (scientific CMOS), may be cited as an example of such a detector. The CMOS detector 221 integrates its readout and multiplexing circuit (or ROIC) which is linked to the proximity electronics (or E-prox) 220 of the detector. This proximity electronics associated with the ROIC carries out all the operations of analog-digital conversion and restoration of the signal (NUCs—Non Uniformity Corrections) to make it possible to utilize the images acquired with maximum performance in daytime and at nighttime. It is linked to a display device 40 so as to ensure a scene viewing function for an operator. The visible image 42 is displayed, but not necessarily the SWIR image 41.

Figure 2:
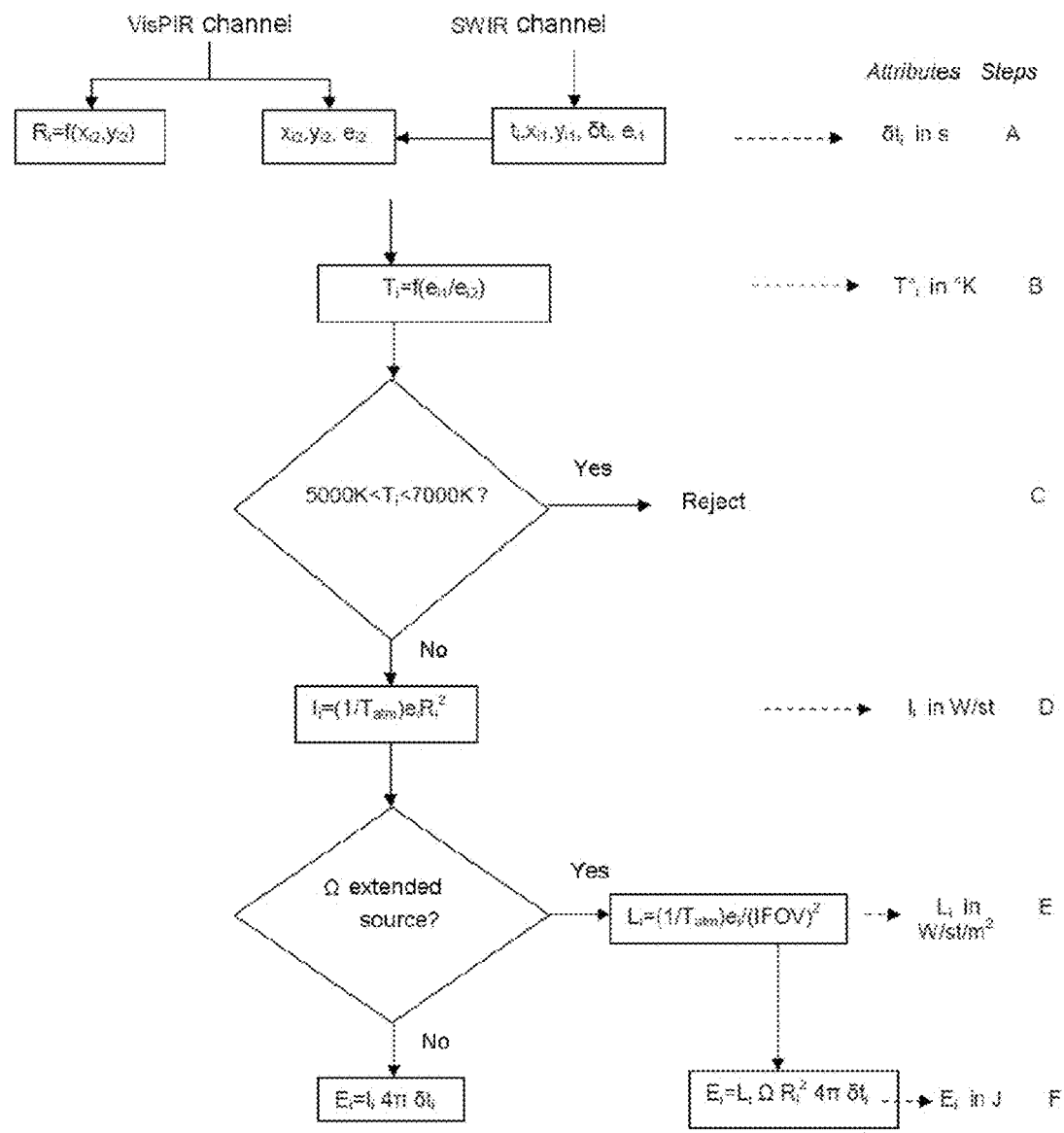
FIG. 2 represents an exemplary flowchart of the steps of the method according to the invention, FIG. 3 are examples of images obtained by the SWIR detector (FIG. 3a), by the VisNIR detector without inlaying (FIG. 3b) and with inlaying (FIG. 3c) of a detected event on the SWIR image accompanied by the distance associated with this event.

These detectors 22, 21 are linked to a unit 50 for processing the visible 42 and SWIR 41 images obtained respectively by the two detectors, and which is able to implement the following steps described in conjunction with FIG. 1 and the flowchart of FIG. 2. Threats (or events) are characterized by optical signatures on the acquired images. According to the invention, an event is detected and then four attributes are defined, on the basis of which these optical signatures will be classed.

All the threats are characterized by very brief optical signatures which are therefore very difficult for an operator to discern by eye when looking at a screen or even when viewing directly, on account of the spectral emission region; they must therefore be detected through automatic processing.

The temporal profiles of the signatures, that is to say their duration, and possibly rise time and descent profile, constitute a first attribute, which is obtained in the following manner.

An event is firstly detected by detection means 51 and certain of its characteristics are estimated in the following manner. Images of the scene to be observed, termed SWIR images 41, are acquired successively by the SWIR detector. Images of this scene, termed VisNIR images 42, are acquired simultaneously by the visible detector, these SWIR and VisNIR images being temporally synchronized with each other by means of electronics 30 for driving and synchronizing the detectors, and then stored in memory for classification purposes. This synchronization may result from acquiring images at the same rate for both detectors, but the rates are generally different as mentioned previously.

Figure 3A:
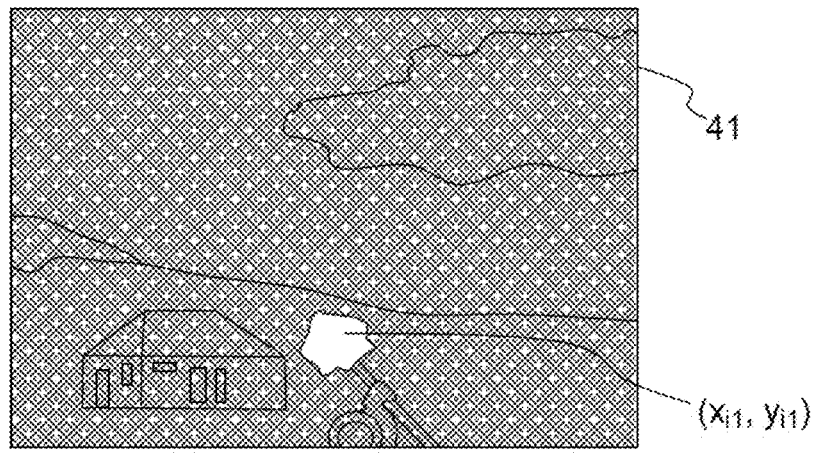

The SWIR images 41 are compared with one another to determine for each pixel $(x_{i1}, y_{i1})$ the variation in SWIR illumination. The illumination $e_{i1}$ is given by the signal integrated over the pixel on which the image of the threat is formed. If this variation in illumination is greater than a predetermined threshold or one that can be adapted according to the signatures of the temporal spatial backgrounds, then it is considered to represent the SWIR signature of an event: an event i is detected as shown in FIG. 3a. This illumination threshold is typically from 2 to 10 times the variation in the standard deviation of the background according to the detection probabilities and the false alarm rates desired at this stage. An illumination $e_{i1}$ in W/m² is thus determined in the spectral reception band determined by the SWIR detector, its optic 15 and its possible filters.

Its duration $\delta t_i$ in seconds is also determined, that is to say the duration for which this variation in illumination is greater than this threshold. This duration $\delta t_i$ therefore constitutes the first attribute for classifying the event (step A).

On the basis of this event detection carried out in the SWIR region, it will be possible to measure on the VisNIR images 42 the flux level collected in a synchronous manner in the same viewing field. The following is carried out.

Means 53 are used to determine the coordinates of the pixel $(x_{i2}, y_{i2})$ corresponding to this event in the VisNIR images 42 synchronized with said SWIR images. When the dimensions of the SWIR and VisNIR images are the same, the coordinates of the pixel in the visible images are identical to those of the SWIR images; we have $x_{i1}=x_{i2}$ and $y_{i1}=y_{i2}$. If the VisNIR images are more resolved than the SWIR images because the spatial resolution of the VisNIR detector is greater than that of the SWIR detector as in the example of FIG. 3, the coordinates of the VisNIR pixels are determined in correspondence with the SWIR pixel on which the detection is made. This correspondence operation for the VisNIR and SWIR pixels can be carried out in the factory after the detector matrices are integrated onto the optic. If the detection is made on adjacent SWIR pixels, the position of its barycenter is determined and the VisNIR pixels corresponding to this barycenter are located. By measuring the peak signal in the VisNIR band or by summing the contribution of the adjacent pixels illuminated by the event, the VisNIR illumination of the event $e_{i2}$ in W/m² in the spectral band of this receiver is determined. It is possible that the event cannot be detected on the VisNIR channel. In this case, the illumination $e_{i2}$ and zero or cannot be determined because its amplitude is too low relative to the noise or uncertainties.

The ratio $e_{i2}/e_{i1}$ is calculated for this pixel. This ratio of VisNIR illumination to SWIR illumination makes it possible to estimate a temperature $T_i$ (in K) of the event (step B), via the means 54 for calculating the attributes. This temperature is the second attribute of the optical signature. For this purpose a predetermined table is used which makes it possible to establish a correspondence between these ratios of illuminations and the corresponding black body or gray body temperature, using for example Planck's law, the contribution of which is integrated for the two spectral bands, SWIR and VisNIR, as a function of temperature. The digital signal arising from the two channels is calibrated in W/m² to provide the measurements in this unit. Alternatively, the detectors can be calibrated by measuring the signal that they deliver when sighting a calibration black body in the laboratory.

This temperature is typically used to reject a source of false alarms consisting of the Sun or its modulation or its scattering by clouds, or else its reflection by mirrors, metallic contours (such as those of windows or signposts) or else by reflections on the water. Indeed, on a mobile platform these solar reflections are liable to generate spatio-temporal signatures in the SWIR region that are very close to those of the munitions sought. The Sun or its reflections, the black body temperature of which is around 5800K, will generate an intense signature at shorter wavelength (in the visible and the near IR) that is much stronger than those associated with the pyrotechnic signatures of the start of blasts having a black body temperature of less than 2000 K. The detection of intense signatures in the visible or near IR region thus makes it possible to neutralize possible detections in the SWIR on the pixels covering the same instantaneous viewing field. The flux level collected on the visible detector makes it possible, via the temperature, to validate or to reject the detection of the event: for a daytime scene, if the temperature is greater than a threshold (5000 K for example), then this event is a false alarm, and if it is not, then the event is validated (step C). This validated event can furthermore be inlaid on the visible image for the operator's attention.

This temperature attribute is advantageously determined by the processing unit in parallel with the first attribute (duration).

All materiel from which these threats originate is characterized by lethality or effectiveness ranges P beyond which the threat is no longer effective. They are in class 100 m for an RPG or a short-range anti-tank rocket, and in class 500 m to 8 km for anti-tank missiles, depending on their type, or shell rounds, depending on their caliber and their charge.

According to the invention, the processing unit comprises means 52 for estimating the distance $R_i$ of a point of the visible image 42 (object point of the scene-imaging system).

The imaging system is installed aboard a platform, for example terrestrial. By ascertaining the elevation and bearing directions in the frame of reference of the VisNIR detector and by ascertaining its position in terms of height and orientation with respect to the platform, or better still with respect to the ground (by utilizing the information regarding the relative position of the platform with respect to the ground), it is possible to estimate the distance of the points of the image from the ground as a function of their apparent elevation by assuming a horizontal plane ground, or better still by utilizing a digital terrain model (DTM) charted for example by the GPS position of the vehicle and by data arising from the images delivered by the visible detector, providing a horizon profile, or by the location of landmarks in the field of the image. When the platform is fixed on an infrastructure, it is possible, during its installation, to pair all the points of the visible image of the terrestrial scene with its distance. When the platform is mobile, the angular velocities of the characteristic points of the scene can be measured between successive VisNIR images with good precision, on account of the angular resolution of the imaging system. This field of angular velocities throughout the scene is called the optical flow. It makes it possible to measure the rotation or rotations of the field and the direction of the velocity vector of the platform (after derotation of the field), for which direction the optical flow is zero. The wide coverage of the angular field of the panoramic imaging system makes it possible to ensure that the direction of the platform's velocity vector is in the observation field and coincides with a pixel. By ascertaining the velocity of the platform, information delivered by its conduct and its propulsion, or by utilizing the information from an inertial unit or else possibly measured by utilizing the short-range ground optical flow, the measurement of the angular velocity of the elements of the scene and the measurement of the angular deviation between the pixel in coincidence with the velocity vector of the platform and the direction associated with the image of an element of the scene of which an angular velocity is estimated, the distance R thereof may be estimated.

Figure 3B:
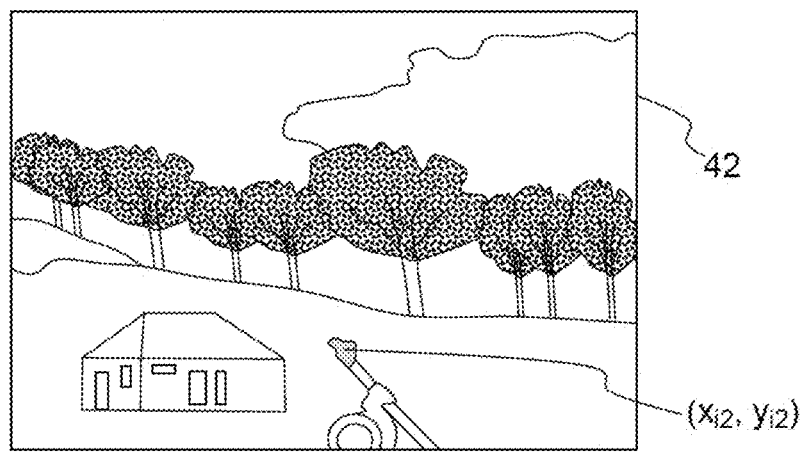
Figure 3C:
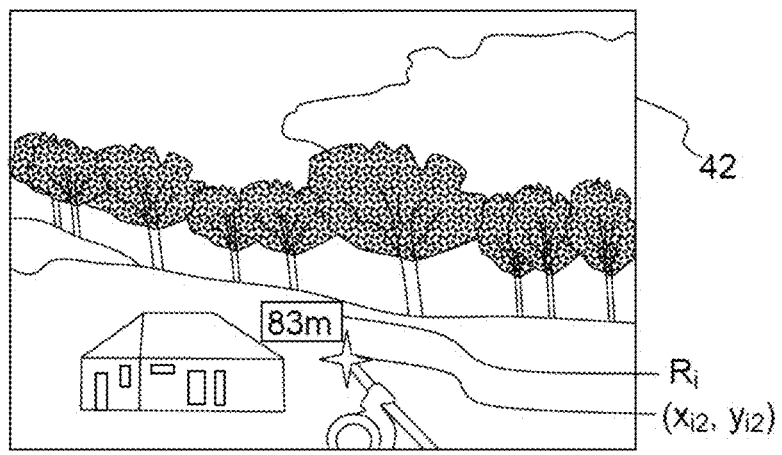

As shown in FIG. 3c, the distance $R_i$ associated with the event i can be displayed in real time on the visible image 42; the event i is inlaid on the visible image using for example a predetermined symbol, such as a colored reticle. The SWIR image 41 shown in FIG. 3a is generally not displayed.

On the basis of this distance and of the visible illumination obtained for this event, the means 54 are used to calculate its intensity $I_i$ (in W/sr), this being the third attribute (step D). Indeed, it is recalled that the amplitude of the SWIR illumination depends on the distance R through a $1/R^2$ law and on the atmospheric attenuation $T_{atm}$ which will afford a transmission coefficient which depends on the distance R. We have:

$$I_i = (1/T_{atm}) e_i R_i^2.$$

In the SWIR images 41, the optical signatures of the sources are either resolved (extended over several pixels) or unresolved (the image of the source is formed on a single pixel) or, in an intermediate situation, are hardly extended with respect to the instantaneous field of view defined by the size of the pixel, the focal length of the optic and its MTF (Modulation Transfer Function) in band 1.

Figure 4:
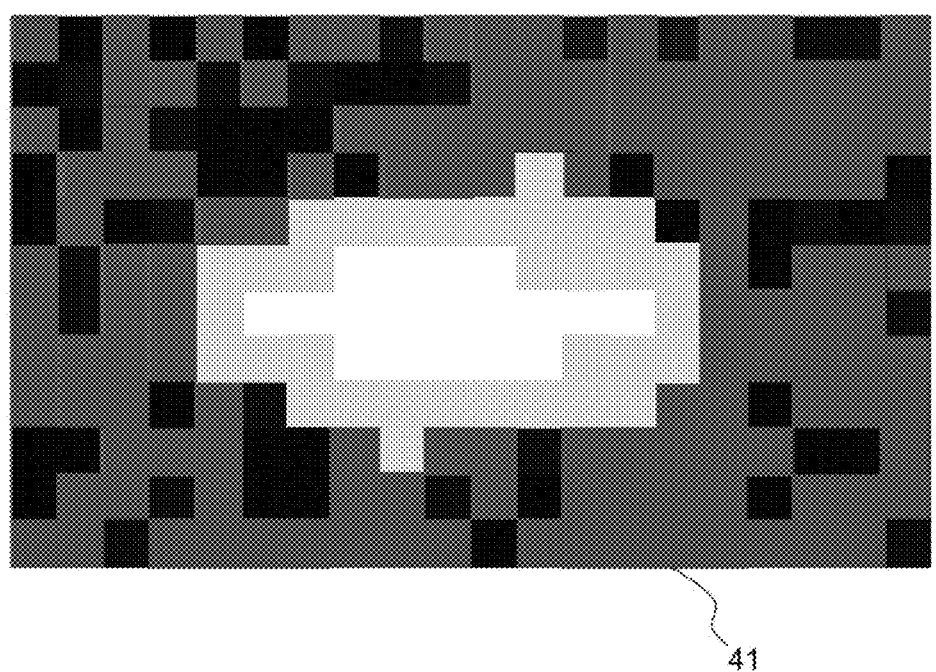
FIG. 4 presents an exemplary magnified SWIR image of a resolved event.

When the signature is spatially resolved as shown in the example of FIG. 3 or 4, the illumination $e_{i1}$ corresponding to the amplitude of the peak signal seen on a pixel is determined by the luminance of the signature during the integration time (step E), and is obtained by the means 54. This value constitutes a fourth attribute for classifying the threat. This attribute is very robust since it does not depend on the distance R through a $1/R^2$ law as in the case of the illumination delivered by an unresolved source. In this case, the luminance $L_i$ in W/sr/m² of the event is given by the peak illumination seen on a pixel through the relation:

$$L_i = e_{i1}/[T_{atm}(IFOV)^2],$$

with IFOV being the solid angle of the instantaneous field of view of the detector. Alternatively, the mean luminance can be given by integrating the signal $e_{i1}$ collected by the adjacent pixels on which the image of the source is formed, divided by the solid angle $\Omega$ in steradians at which the resolved event is seen. Since the illumination received is dependent on the distance R ($1/R^2$ law), it does not constitute an attribute for classifying the threat. Only the barycenter of this signature has significance, by allowing angular location in terms of elevation and bearing in the frame of reference of the SWIR detector or in the frame of reference of the platform by knowing the motion of the former with respect to the chassis if the imaging system is mounted on a member articulated to the platform (turret, "pan and tilt" platform). This event is then classified "resolved" as a function of its duration, its temperature, its intensity and its luminance.

Finally, the intensity of the event or its luminance associated with its magnitude and with its duration make it possible to estimate the energy $E_i$ (in J) of the event (step F)

which can be linked to an estimation of the range of the threat and of its munition. They are calculated by the means 54.

When the event i is resolved we have: $E_i = L_i \Omega R_i^2 4\pi \delta t_i$.

When the event is unresolved we have: $E_i = I_i 4\pi \delta t_i$.

These four (if signature unresolved) or five (if signature resolved) attributes make it possible to robustly classify the threat with the means 55. When the event has been validated on the basis of its temperature or, rather, has not been considered to be a false alarm, it is then classified on the basis of its duration, its temperature, its intensity, its energy and possibly its luminance and predetermined classes as shown in the table of FIG. 5. These steps are repeated for each other pixel of the SWIR image.

By associating the classification of the threat and the estimation of the distance and energy of the event, it is possible to decide whether or not the imaging system or the observer is situated in the threat lethality region P and thus to undertake, if necessary and possible, a suitable retaliation in real time. This retaliation can be triggered automatically by the means 56 of the processing unit as shown in FIG. 1 or manually by the operator.

This detection and classification method can in particular be implemented on the basis of a computer program product, this computer program comprising code instructions making it possible to perform the steps of the method. It is recorded on a medium readable by computer, also used to synchronize SWIR images and visible images. The medium can be electronic, magnetic, optical, electromagnetic or be a dissemination medium of infrared type. Such media are for example, semi-conductor memories (Random Access Memory (RAM), Read-Only Memory (ROM)), tapes, magnetic or optical diskettes or disks (Compact Disk—Read Only Memory (CD-ROM), Compact Disk—Read/Write (CD-R/W) and DVD).

The invention claimed is:

1. A method for detecting and classifying events of firing threats type of a scene, the method comprising:
providing a single-pupil imaging system mounted on a mobile platform and equipped with several detectors, including a detector configured to operate in the 0.6 µm-1.1 µm wavelength band that comprises a Visible Near Infra Red (VisNIR) detector and a detector configured to operate in the 0.9 µm-1.7 µm wavelength band that comprises a Short Wave Infra Red (SWIR) detector, associated with a detection processing unit, which is configured to implement a step of acquiring successive 2D images of the scene which arise from the VisNIR detector that comprise VisNIR images, and successive 2D images of the scene which arise from the SWIR detector and are synchronized with the VisNIR images that comprise SWIR images, a step of displaying the VisNIR images, and a step of processing the VisNIR and SWIR images via the detection processing unit, wherein the step of processing the images comprises the following sub-steps:
comparing the successive SWIR images so as to determine, for each pixel $(x_1, y_1)$ and neighboring pixels, a variation in illumination from one SWIR image to another SWIR image and determine a peak value $e_1(t)$ of SWIR illuminations,
if the variation in SWIR illumination is greater than a predetermined illumination threshold, then the variation in SWIR illumination during which said threshold is exceeded is designated as a signature of an event i and an event is associated with said pixel $(x_1, y_1)$ or with a barycenter of the pixels considered, and the step of processing the images further comprises the sub-steps of:
determining a date $t_i$ of the event i,
determining a temporal shape and a duration of the signature of the event,
determining the coordinates of a pixel $(x_2, y_2)$ and of neighboring pixels corresponding to the pixel $(x_1, y_1)$ or to a barycenter in the VisNIR images synchronized with the SWIR images, and for the pixel $(x_2, y_2)$ and the neighboring pixels:
calculating a variation in the illumination from one VisNIR image to another VisNIR image and calculate a peak value $e_2(t)$ of VisNIR illuminations, comparing these variations in SWIR and VisNIR illumination, and comparing the peak values $e_1(t)$ and $e_2(t)$ so as to estimate a temperature of the event on a basis of a predetermined lookup table,
if the scene is a daytime scene and the temperature is greater than a temperature threshold, then the event is a false alarm and the previous steps from the comparing step are repeated with another pixel of the SWIR images,
otherwise:
estimating a distance Ri of a corresponding point of the real-time scene on a basis of measurements of angular speeds of elements of the scene, of a speed of the platform, and of the VisNIR images,
calculating an intensity $I_i$ of the event i on a basis of the SWIR and VisNIR illuminations of the pixel and on a basis of the distance $R_i$,
estimating a total energy $E_i$ of the event on a basis of a temporal shape of the signature and of the intensity $I_i$,
classifying the event i as a function of its duration $\delta t_i$, its temperature $T_i$, its intensity $I_i$ and its energy $E_i$,
estimating an effectiveness range Pi of the event i on a basis of its classification,
comparing the effectiveness range Pi with a distance Ri, if the distance Ri is less than the effectiveness range Pi, then if possible, triggering a suitable retaliation in real time.

2. The method for classifying events of a scene as claimed in claim 1, wherein when an event is associated with adjacent pixels, then a luminance of a set of these events is determined, and this set of events is also classified as a function of its luminance.

3. The method for classifying events of a scene as claimed in claim 1, wherein the event is inlayed on the VisNIR image displayed.

4. The method for classifying events of a scene as claimed in claim 3, wherein the distance associated with the event is displayed on the VisNIR image displayed.

5. The method for classifying events of a scene as claimed in claim 1, wherein the retaliation is triggered automatically or manually by an operator.

6. A non-transitory computer program product, said non-transitory computer program product comprising code instructions configured to perform the steps of the method as claimed in claim 1, when said non-transitory computer program is executed on a computer.

7. A system for detecting and classifying events of a scene, which comprises:
a system for single-pupil imaging of the scene, mounted on a mobile platform and equipped with several detectors, including a Visible Near Infra Red (VisNIR) detector and a Short Wave Infra Red (SWIR) detector, a detection processing unit linked to the detectors,
means for estimating the distance between points of the scene and the imaging system,
an events management system linked to the detection processing unit and configured so as to be triggered, on the basis of the classified event and of its distance,
a display device linked to the detection processing unit,
the detection processing unit being configured to compare the successive SWIR images so as to determine, for each pixel $(x_1, y_1)$ and neighboring pixels, a variation in illumination from one SWIR image to another SWIR image and determine a peak value $e_1(t)$ of SWIR illuminations,
if the variation in SWIR illumination is greater than a predetermined illumination threshold, then the variation in SWIR illumination during which said threshold is exceeded is designated as a signature of an event i and an event is associated with said pixel $(x_1, y_1)$ or with a barycenter of the pixels considered, and the detection processing unit configured to:
determine a date $t_i$ of the event i,
determine a temporal shape and a duration of the signature of the event,
determine the coordinates of a pixel $(x_2, y_2)$ and of neighboring pixels corresponding to the pixel $(x_1, y_1)$ or to a barycenter in the VisNIR images synchronized with the SWIR images, and for the pixel $(x_2, y_2)$ and the neighboring pixels:
the detection processing unit is further configured to calculate a variation in the illumination from one VisNIR image to another VisNIR image and calculate a peak value $e_2(t)$ of VisNIR illuminations, comparing these variations in SWIR and VisNIR illumination, and comparing the peak values $e_1(t)$ and $e_2(t)$ so as to estimate a temperature of the event on a basis of a predetermined lookup table,
if the scene is a daytime scene and the temperature is greater than a temperature threshold, then the event is a false alarm and the detection processing unit is configured to repeat the comparison with another pixel of the SWIR images, otherwise:
the detection processing unit is further configured to estimate a distance Ri of a corresponding point of the real-time scene on a basis of measurements of angular speeds of elements of the scene, of a speed of the platform, and of the VisNIR images,
the detection processing unit is further configured to calculate an intensity $I_i$ of the event i on a basis of the SWIR and VisNIR illuminations of the pixel and on a basis of the distance $R_i$,
the detection processing unit is further configured to estimate a total energy $E_i$ of the event on a basis of a temporal shape of the signature and of the intensity $I_i$,
the detection processing unit is further configured to classify the event i as a function of its duration $\delta t_i$, its temperature $T_i$, its intensity $I_i$ and its energy $E_i$,
the detection processing unit is further configured to estimate an effectiveness range Pi of the event i on a basis of its classification,
the detection processing unit is further configured to compare the effectiveness range Pi with a distance Ri,
if the distance Ri is less than the effectiveness range Pi, then if possible, the detection processing unit is further configured trigger a suitable retaliation in real time.

8. A system for detecting and classifying events of a scene, which comprises:
a system for single-pupil imaging of the scene, mounted on a mobile platform and equipped with several detectors, including a Visible Near Infra Red (VisNIR) detector and a Short Wave Infra Red (SWIR) detector,
a detection processing unit linked to the detectors,
means for estimating a distance between points of the scene and the imaging system,
an events management system linked to the detection processing unit and configured to be triggered, on a basis of a classified event and of its distance,
a display device linked to the detection processing unit,
wherein the detection processing unit comprises means for implementing the detection and classification that comprises a non-transitory computer program comprising code instructions configured to perform the steps of the method as claimed in claim 1, when said non-transitory computer program is executed on a computer.

* * * * *